US009749616B2

(12) United States Patent
Yen et al.

(10) Patent No.: US 9,749,616 B2
(45) Date of Patent: Aug. 29, 2017

(54) 3D IMAGE ADJUSTMENT METHOD AND 3D DISPLAY APPARATUS USING THE SAME

(71) Applicant: AU Optronics Corp., Hsin-Chu (TW)

(72) Inventors: Yi-Ting Yen, Hsin-Chu (TW);
Fu-Chuan Tsai, Hsin-Chu (TW);
Chia-Pu Ho, Hsin-Chu (TW)

(73) Assignee: AU OPTRONICS CORP., Hsinchu (TW)

( * ) Notice: Subject to any disclaimer, the term of this patent is extended or adjusted under 35 U.S.C. 154(b) by 390 days.

(21) Appl. No.: 14/243,179

(22) Filed: Apr. 2, 2014

(65) Prior Publication Data

US 2015/0237331 A1    Aug. 20, 2015

(30) Foreign Application Priority Data

Feb. 20, 2014 (TW) .............................. 103105668 A

(51) Int. Cl.
*H04N 13/00* (2006.01)
*H04N 13/04* (2006.01)

(52) U.S. Cl.
CPC ....... *H04N 13/0402* (2013.01); *H04N 13/047* (2013.01)

(58) Field of Classification Search
CPC .... G02F 1/13; G02F 1/13363; G02F 2413/02; G02F 2413/09; H04N 13/0468;
(Continued)

(56) References Cited

U.S. PATENT DOCUMENTS 4,649,425 A * 3/1987 Pund .................. G02B 27/0093
348/52
5,132,839 A * 7/1992 Travis ................ H04N 13/0411
348/E13.031
(Continued)

FOREIGN PATENT DOCUMENTS

CN         102572484         7/2012
CN         102868894         1/2013
(Continued)

OTHER PUBLICATIONS

China Patent Office, "Office Action," May 12, 2015.

*Primary Examiner* — Frank Huang
(74) *Attorney, Agent, or Firm* — WPAT, PC; Justin King

(57) ABSTRACT

A three-dimensional image adjustment method includes: displaying a three-dimensional image, which is composed by a first to Nth two-dimensional images with respective different viewing angles and formed by projecting the N two-dimensional images through a first to Nth viewing angles of a three-dimensional display apparatus, respectively, and the D1th to D2th of the N viewing angles are defined to a normal-viewing zone; and shifting the N two-dimensional images in first or second direction according to positions of first and second viewers, the D1th and D2th viewing angles, and projecting the N two-dimensional images through the first to Nth viewing angles, respectively, when the first and second viewers are located at the L1th and L2th of the N viewing angles, respectively, wherein at least one of the L1th and L2th viewing angle is located out of the normal-viewing zone. A three-dimensional display apparatus is also provided.

10 Claims, 3 Drawing Sheets

(58) Field of Classification Search
CPC ........... H04N 13/0411; H04N 13/0454; H04N 13/0409; H04N 13/0402; H04N 13/047; H04N 13/0404; G02B 27/26; G02B 27/2214; G09G 5/14
See application file for complete search history.

(56) References Cited

U.S. PATENT DOCUMENTS

| | | | | |
|---|---|---|---|---|
| 5,801,811 | A * | 9/1998 | Lo | G02B 27/2214 355/22 |
| 5,808,792 | A * | 9/1998 | Woodgate | G02B 27/0093 348/59 |
| 5,973,700 | A * | 10/1999 | Taylor | G03B 35/14 345/427 |
| 6,049,424 | A * | 4/2000 | Hamagishi | G02B 27/2214 345/419 |
| 6,064,521 | A * | 5/2000 | Burke | G02B 27/26 348/E5.137 |
| 6,172,807 | B1 * | 1/2001 | Akamatsu | G02B 27/0093 348/51 |
| 6,377,295 | B1 * | 4/2002 | Woodgate | G02B 27/0093 348/59 |
| 6,542,296 | B2 * | 4/2003 | Lee | G02B 27/225 348/E13.029 |
| 6,888,540 | B2 * | 5/2005 | Allen | G02B 27/2214 345/419 |
| 7,319,436 | B2 * | 1/2008 | Tomisawa | H04N 13/0468 345/6 |
| 7,425,951 | B2 * | 9/2008 | Fukushima | H04N 13/0409 345/419 |
| 7,450,188 | B2 * | 11/2008 | Schwerdtner | G02B 27/225 348/E13.029 |
| 7,889,152 | B2 * | 2/2011 | Kim | G02B 27/2264 345/7 |
| 8,243,127 | B2 * | 8/2012 | Goulanian | G02B 27/2214 348/54 |
| 8,456,516 | B2 * | 6/2013 | Kimpe | G02B 27/2214 348/42 |
| 8,459,797 | B2 * | 6/2013 | Kuo | G02B 3/08 353/7 |
| 8,542,432 | B2 * | 9/2013 | Robinson | H04N 13/0404 359/315 |
| 8,558,853 | B2 * | 10/2013 | Sagardoyburu | G02B 27/0093 345/690 |
| 9,063,382 | B2 * | 6/2015 | Kim | H04N 13/0409 |
| 9,229,241 | B2 * | 1/2016 | Woo | G02B 27/2214 |
| 2004/0109115 | A1 * | 6/2004 | Tsai | G02F 1/13363 349/117 |
| 2006/0291050 | A1 * | 12/2006 | Shestak | G03B 21/606 359/443 |
| 2008/0068372 | A1 * | 3/2008 | Krah | H04N 13/0402 345/419 |
| 2008/0316597 | A1 * | 12/2008 | Tsai | G02B 27/2214 359/465 |
| 2010/0007939 | A1 * | 1/2010 | Gulvin | G02B 3/0062 359/290 |
| 2010/0166260 | A1 * | 7/2010 | Huang | G06K 9/00771 382/103 |
| 2012/0057132 | A1 * | 3/2012 | Roder | H04N 5/74 353/7 |
| 2013/0176303 | A1 * | 7/2013 | Ek | H04N 13/0402 345/419 |
| 2014/0085182 | A1 * | 3/2014 | Lin | G02B 27/2214 345/156 |

FOREIGN PATENT DOCUMENTS

| | | |
|---|---|---|
| CN | 103281545 | 9/2013 |
| TW | 201027980 | 7/2010 |
| TW | 201234838 | 8/2012 |

* cited by examiner

S602 display a three-dimensional image, wherein the three-dimensional image is composed by the first to Nth two-dimensional images with respective different viewing angles and is formed by projecting the N two-dimensional images through the first to Nth viewing angles of a three-dimensional display apparatus, respectively, the Mth and (M+1)th of the N two-dimensional images are referred to the two two-dimensional images having adjacent viewing angles, wherein N>2 and M<(N-1), and a zone between the D1th and D2th of the N viewing angles is defined to as a normal-viewing zone

S604 shift the N two-dimensional images either in a first direction or in a second direction according to a position of a first viewer, a position of a second viewer, the D1th viewing angle and the D2th viewing angle, and thereby project the N shifted two-dimensional images through the first to Nth viewing angles of the three-dimensional display apparatus, respectively, when the first viewer is located at the L1th of the N viewing angles and the second viewer is located at the L2th of the N viewing angles, wherein at least one of the L1th and L2th viewing angle is located out of the normal-viewing zone

FIG. 6

3D IMAGE ADJUSTMENT METHOD AND 3D DISPLAY APPARATUS USING THE SAME

TECHNICAL FIELD

The present disclosure relates to the field of three-dimensional (3D) display technology, and more particularly to 3D image adjustment method and 3D display apparatus using the same.

BACKGROUND

Because naked-eye three-dimensional (3D) display apparatus is not only suitable for commercial advertisement in public places but also suitable for normal household use, and thereby has a lot of business opportunities in market. Thus, various 3D display apparatuses have been developed in these years.

However, for a naked-eye 3D display apparatus, a viewer located at some specific positions relative to the naked-eye 3D display apparatus may not able to observe 3D images successfully while the naked-eye 3D display apparatus is displaying 3D images due to the cross talk issue, which is resulted by the left eye of the viewer may observer 3D images, which are originally designed for the right eye, and the right eye of the viewer may observer 3D images, which are originally designed for the right eye. Because the cross talk issue may further lead to ghost image issue, and the viewer may feel dizzy and uncomfortable. These specific positions which may lead to the ghost images are defined to as an abnormal-viewing zone (so-called dead zone).

For providing the viewer with a more comfortable visual experience, it is quite important to develop a 3D display apparatus capable of eliminating the dead zone issue.

SUMMARY

One aspect of the present disclosure provides a three-dimensional image adjustment method capable of automatically adjusting the positions of the abnormal-viewing zone (dead zone) and consequentially the viewers can have a more comfortable three-dimensional visual experience.

Another aspect of the present disclosure provides a three-dimensional display apparatus adopting the aforementioned three-dimensional image adjustment method.

The present disclosure discloses a three-dimensional image adjustment method, which includes steps of: displaying a three-dimensional image, wherein the three-dimensional image is composed by a first to Nth two-dimensional images with respective different viewing angles and is formed by projecting the N two-dimensional images through a first to Nth viewing angles of a three-dimensional display apparatus, respectively, the Mth and (M+1)th of the N two-dimensional images are referred to the two two-dimensional images having adjacent viewing angles, wherein N>2 and M<(N−1), and a zone between the D1th and D2th of the N viewing angles is defined to as a normal-viewing zone; and shifting the N two-dimensional images either in a first direction or in a second direction according to a position of a first viewer, a position of a second viewer, the D1th viewing angle and the D2th viewing angle, and thereby projecting the N shifted two-dimensional images through the first to Nth viewing angles of the three-dimensional display apparatus, respectively, when the first viewer is located at the L1th of the N viewing angles and the second viewer is located at the L2th of the N viewing angles, wherein at least one of the L1th and L2th viewing angle is located out of the normal-viewing zone.

The present disclosure further discloses a three-dimensional display apparatus, which includes a display panel, a detection unit and a three-dimensional image processing unit. The display panel is configured to display a three-dimensional image. The three-dimensional image is composed by a first to Nth two-dimensional images with respective different viewing angles and is formed by projecting the N two-dimensional images through a first to Nth viewing angles of the display panel, respectively. The Mth and (M+1)th of the N two-dimensional images are referred to the two two-dimensional images having adjacent viewing angles, wherein N>2 and M<(N−1). The D1th and D2th of the N viewing angles are defined to as a normal-viewing zone. The detection unit is configured to detect a number of viewer of the three-dimensional display apparatus and the respective viewing angle of the detected one or more viewers. The three-dimensional image processing unit is configured to provide the three-dimensional image to the display panel, shift the N two-dimensional images either in a first direction or in a second direction according to a position of a first viewer, a position of a second viewer, the D1th viewing angle and the D2th viewing angle, and thereby project the N shifted two-dimensional images through the first to Nth viewing angles of the display panel, respectively, when the first viewer is located at the L1th of the N viewing angles and the second viewer is located at the L2th of the N viewing angles, wherein at least one of the L1th and L2th viewing angle is located out of the normal-viewing zone.

In summary, by shifting the N 2D images either in a first direction or in a second direction according to the positions of viewers and the D1 and D2 viewing angles and thereby projecting the N shifted 2D images through the first to Nth viewing angels of a display panel, the present disclosure can automatically adjust the positions of the abnormal-viewing zone (dead zone) and consequentially the viewers can have a more comfortable three-dimensional visual experience.

BRIEF DESCRIPTION OF THE DRAWINGS

The present disclosure will become more readily apparent to those ordinarily skilled in the art after reviewing the following detailed description and accompanying drawings, in which:

FIG. 6 is a flowchart illustrating a three-dimensional image adjustment method in accordance with an embodiment of the present disclosure.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
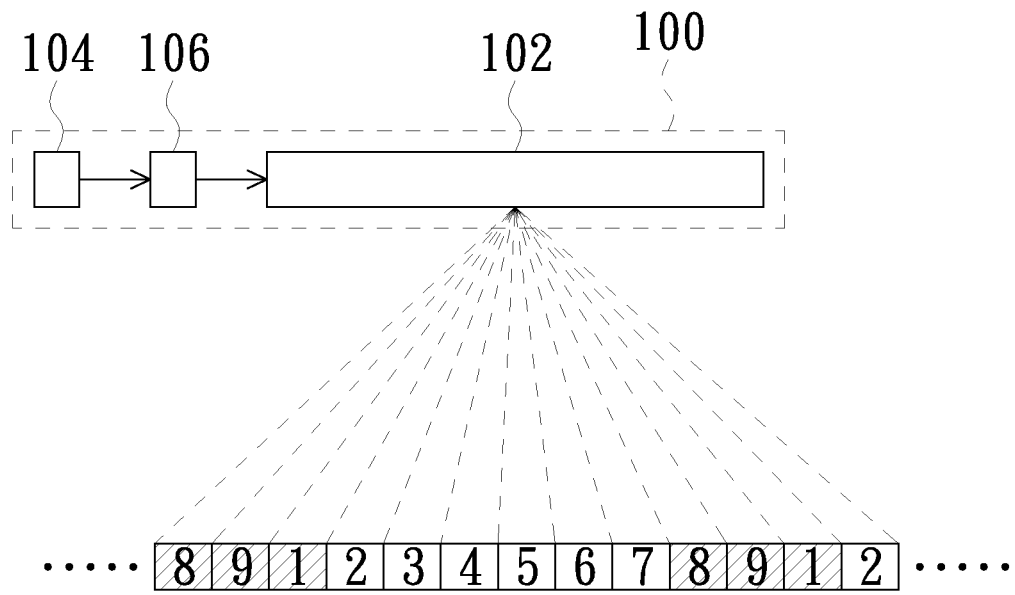
FIG. 1 is a schematic view of a 3D display apparatus in accordance with an embodiment of the present disclosure.

FIG. 1 is a schematic view of a three-dimensional (3D) display apparatus in accordance with an embodiment of the present disclosure. As shown, the 3D display apparatus 100 in this embodiment includes a display panel 102, a detection unit 104 and a 3D image processing unit 106. The display panel 102 is configured to display 3D images, each is composed by N two-dimensional (2D) images (i.e., the first to Nth 2D images) with respective different viewing angles and is formed by projecting the N 2D images through the first to Nth viewing angles of the display panel 102, respectively; wherein N>2. As illustrated in FIG. 1, for example, the 3D image is composed by nine 2D images (i.e., the first to ninth 2D images) with respective different viewing angles and is formed by projecting the nine 2D images through the first to ninth viewing angles of the display panel 102, respectively.

In this embodiment, the Mth and (M+1)th of the N 2D images are referred to as the two 2D images having adjacent viewing angles; wherein M<(N−1). Moreover, the D1th to D2th of the N viewing angles of the display panel 102 are defined to as a normal-viewing zone (so-called sweet zone). As illustrated in FIG. 1, for example, each two adjacent numbers are referred to as the two 2D images having adjacent viewing angles in the nine 2D images with respective viewing angles. Moreover, the second to seventh of the nine viewing angles of the display panel 102 are defined to as a normal-viewing zone (sweet zone); and the first, eighth and ninth viewing angles are defined to as an abnormal-viewing zone (so-called dead zone and marked by slash lines).

The detection unit 104 is configured to detect the number of viewer associated with the 3D display apparatus 100 and the respective viewing angles of the detected viewers. In one embodiment, the detection of the number of viewer and the respective viewing angles is realized by face tracking manner. The 3D image processing unit 106 is configured to provide the aforementioned 3D image to the display panel 102 for displaying. In addition, the 3D image processing unit 106 is further configured to perform a 3D image adjustment operation when the detection unit 104 detects that there is a first viewer located at the L1th of the N viewing angles of the display panel 102 and a second viewer located at the L2th of the N viewing angles of the display panel 102; wherein at least one of the L1th or L2th viewing angle is located in the abnormal-viewing zone (dead zone). The condition for performing the 3D image adjustment operation will be described in detailed as follow. Please refer to FIGS. 1 and 2. As shown, the 3D image processing unit 106 starts to perform the 3D image adjustment operation when the detection unit 104 detects that there are two viewers associated with the 3D display apparatus 100, the viewer 202 is located at the first of the nine viewing angles of the display panel 102, the viewer 204 is located at the fourth of the nine viewing angles of the display panel 102, and the viewer 202 is located in the abnormal-viewing zone (dead zone).

Figure 2:
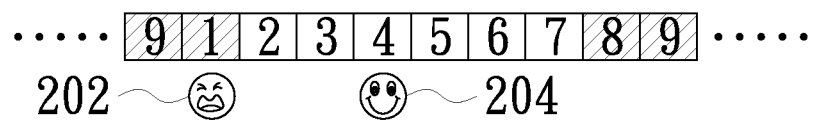
FIG. 2 is a schematic view illustrating the N 2D images before being performed by the 3D image adjustment operation when there exists two viewers.

When determining that there is a need to perform the 3D image adjustment operation, the 3D image processing unit 106 shifts the N 2D images either in a first direction or in a second direction according to the positions of the first and second viewers and the D1th and D2th viewing angles, and thereby projects the N shifted 2D images through the first to Nth viewing angles of the display panel 102, respectively. As illustrated in FIG. 2, for example, the 3D image processing unit 106 shifts the nine 2D images either in a first direction (for example, the direction toward left of the display panel 102) or in a second direction (for example, the direction toward right of the display panel 102) according to the positions of the viewers 202 and 204 and the second and seventh viewing angles, and thereby projects the nine shifted 2D images through the first to ninth viewing angles of the display panel 102, respectively.

The process of the 3D image adjustment operation (specifically, the determination for shifting the N 2D images either in the first direction or in the second direction) will be described in detailed as follow. In one embodiment, the 3D image processing unit 106 is configured to first calculate a shift value according to the positions of the first and second viewers and the D1th and D2th viewing angles, and then shift N 2D images either in the first direction (for example, the direction toward left of the display panel 102) or in the second direction (for example, the direction toward right of the display panel 102) according to the calculated shift value. In one embodiment, the shift value is obtained by averaging N1 and N2; wherein N1 is referred to a value of subtracting the position of the first viewer from a boundary position of the D1th viewing angle, and N2 is referred to a value of subtracting the position of the second viewer from a boundary position of the D2th viewing angle. As illustrated in FIG. 2, for example, the 3D image processing unit 106 first calculates the shift value according to the positions of the viewers 202 and 204 and the second and seventh viewing angles, and then shifts the N 2D images either left or right according to the calculated shift value. Specifically, the shift value is obtained by averaging 0.5 (N1) and 3.5 (N2); wherein 0.5 (N1) is obtained by subtracting 1 (the position of the viewer 202) from 1.5 (the boundary position of the second viewing angle), and 3.5 (N2) is obtained by subtracting 4 (the position of the viewer 204) from 7.5 (the boundary position of the seventh viewing angle. Thus, the shift value calculated by the 3D image processing unit 106 is +2 in the example illustrated in FIG. 2.

Figure 3:
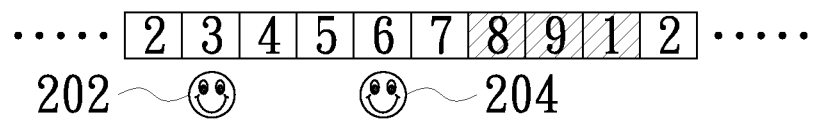
FIG. 3 is a schematic view illustrating the N 2D images shown in FIG. 2 after being performed by the 3D image adjustment operation.

When the calculated shift value is positive, the 3D image processing unit 106 is configured to shift the N 2D images of the shift value in the first direction (for example, the direction toward left of the display panel 102) and thereby project the N shifted 2D images through the first to Nth viewing angles of the display panel 102, respectively. Alternatively, when the calculated shift value is negative, the 3D image processing unit 106 is configured to shift the N 2D images of the shift value in the second direction (for example, the direction toward right of the display panel 102) and thereby project the N shifted 2D images through the first to Nth viewing angles of the display panel 102, respectively. As illustrated in FIG. 2, for example, because the calculated shift value is positive (+2), the 3D image processing unit 106 accordingly left shifts the nine 2D images of 2 and thereby projects the nine shifted 2D images through the first to ninth viewing angles of the display panel 102, respectively, as illustrated in FIG. 3, which is the nine 2D images shown in FIG. 2 after being performed by the 3D image adjustment operation. Thus, through the 3D display apparatus 100 automatically shifting the abnormal-viewing zone (dead zone), the viewers 202 and 204 both are adjusted to locate in the normal-viewing zone (sweet zone) and accordingly have a more comfortable 3D visual experience without any position movement. Furthermore, because the cross talk issue does not occur in the 3D image adjustment operation, the viewers 202 and 204 will not have any uncomfortable feeling during the process of the 3D image adjustment operation. It is to be noted that there is no need to perform the 3D image adjustment operation when both of the viewers 202 and 204 are already located in the normal-viewing zone (sweet zone); in other words, the 3D image adjustment operation is needed to be performed only when at least one of the two viewers 202 and 204 is located in the abnormal-viewing zone (dead zone). Moreover, it is understood that the calculated shift value must be a non-zero integer; in other words, the shift value is required to be rounded to the nearest non-zero integer when originally it is not an integer, otherwise the two viewers 202 and 204 may not successfully observe a 3D image. Moreover, it is to be noted that the 3D image adjustment operation may need to be performed repeatedly until all the viewers are adjusted to locate in the normal-viewing zone (sweet zone).

The aforementioned embodiment is exemplified by having two associated viewers and no any viewer is located between the first viewer and N1 and no any viewer is located between the second viewer and N2; however, it is understood that the present disclosure is not limited thereto. In other words, the present disclosure may also apply to a condition having three or more viewers. However, it is to be noted that only the leftmost and rightmost viewers associated with the 3D display apparatus 100 are needed to be considered for the calculation of the shift value, and the remaining viewer(s) located therebetween is not needed to be considered for the calculation of the shift value. The calculation of the shift value when the 3D display apparatus 100 is associated with three or more viewers will be described in detailed as follows with a reference of FIGS. 4 and 5.

Figure 4:
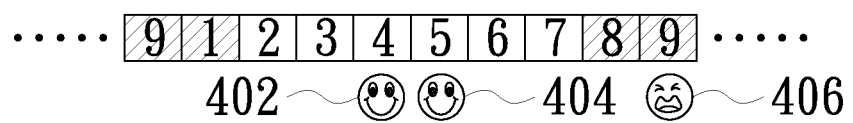
FIG. 4 is a schematic view illustrating the N 2D images before being performed by the 3D image adjustment operation when there exists three viewers.
Figure 5:
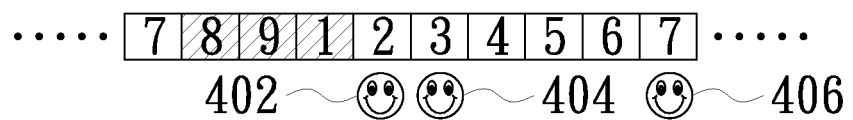
FIG. 5 is a schematic view illustrating the N 2D images shown in FIG. 4 after being performed by the 3D image adjustment operation.

FIG. 4 is a schematic view illustrating the N 2D images before being performed by the 3D image adjustment operation when there exists three associated viewers; and FIG. 5 is a schematic view illustrating the N 2D images shown in FIG. 4 after being performed by the 3D image adjustment operation. As illustrated in FIG. 4, there exists three viewers 402, 404 and 406; wherein the viewers 402 and 404 are located in the normal-viewing zone (sweet zone) and the viewer 406 is located in the abnormal-viewing zone (dead zone). Specifically, the 3D image processing unit 106 first refers the leftmost viewer (that is, the viewer 402) to as the first viewer and the rightmost viewer (that is, the viewer 406) to as the second viewer, calculates the shift value according to the positions of the first and second viewers and the D1th and D2th viewing angles, and then shifts the N 2D images either in the first direction (for example, the direction toward left of the display panel 102) or in the second direction (for example, the direction toward right of the display panel 102) according to the calculated shift value. Specifically, the shift value is obtained by averaging N1 and N2; wherein N1 is referred to a value of subtracting the position of the first viewer from a boundary position of the D1th viewing angle, and N2 is referred to a value of subtracting the position of the second viewer from a boundary position of the D2th viewing angle. As illustrated in FIG. 4, for example, the 3D image processing unit 106 first calculates the shift value according to the positions of the viewers 402 and 406 and the second and seventh viewing angles, and then shifts the nine 2D images either left or right according to the calculated shift value. Specifically, the shift value is obtained by averaging −2.5 (N1) and −1.5 (N2); wherein −2.5 (N1) is obtained by subtracting 4 (the position of the viewer 402) from 1.5 (the boundary position of the second viewing angle), and −1.5 (N2) is obtained by subtracting 9 (the position of the viewer 406) from 7.5 (the boundary position of the seventh viewing angle). Thus, the shift value calculated by the 3D image processing unit 106 is −2 in the example illustrated in FIG. 4. Because the calculated shift value is negative (−2), the 3D image processing unit 106 accordingly right shifts the nine 2D images of 2 and thereby projects the nine shifted 2D images through the first to ninth viewing angles of the display panel 102, respectively, as illustrated in FIG. 5, which is the nine 2D images shown in FIG. 4 after being performed by the 3D image adjustment operation. Thus, through the 3D display apparatus 100 automatically shifting the nine 2D images, the viewers 402, 404 and 406 all are adjusted to locate in the normal-viewing zone (sweet zone) and accordingly have a more comfortable 3D visual experience without any position movement. It is to be noted that there is no need to perform the 3D image adjustment operation when all of the viewers 402, 404 and 406 are already located in the normal-viewing zone (sweet zone); in other words, the 3D image adjustment operation is needed to perform only when at least one of the three viewers 402, 404 and 406 is located in the abnormal-viewing zone (dead zone). Moreover, it is to be noted that the 3D image adjustment operation may need to be performed repeatedly until all the viewers are adjusted to locate in the normal-viewing zone (sweet zone).

According to the above disclosed embodiments, a three-dimensional image adjustment method is summarized to have the steps as illustrated in FIG. 6, which is a flowchart illustrating a 3D image adjustment method in accordance with an embodiment of the present disclosure. As shown, the 3D image adjustment method includes steps of: displaying a 3D image, wherein the 3D image is composed by a first to Nth 2D images with respective different viewing angles and is formed by projecting the N 2D images through a first to Nth viewing angles of a 3D display apparatus, respectively, the Mth and (M+1)th of the N 2D images are referred to the two 2D images having adjacent viewing angles, wherein N>2 and M<(N−1), and the D1th to D2th of the N viewing angles are defined to as a normal-viewing zone (step S602); and shifting the N 2D images either in a first direction or in a second direction according to a position of a first viewer, a position of a second viewer, the D1th viewing angle and the D2th viewing angle, and thereby projecting the N shifted 2D images through the first to Nth viewing angles of the 3D display apparatus, respectively, when the first viewer is located at the L1th of the N viewing angles and the second viewer is located at the L2th of the N viewing angles, wherein at least one of the L1th and L2th viewing angle is located out of the normal-viewing zone (step S604).

In summary, by shifting the N 2D images either in a first direction or in a second direction according to the positions of viewers and the D1 and D2 viewing angles and thereby projecting the N shifted 2D images through the first to Nth viewing angels of a display panel, the present disclosure can automatically adjust the positions of the abnormal-viewing zone (dead zone) and consequentially the viewers can have a more comfortable three-dimensional visual experience.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional image adjustment method, comprising:

displaying a three-dimensional image, wherein the three-dimensional image is composed by a first to Nth two-dimensional images with respective different viewing angles and is formed by projecting the N two-dimensional images through a first to Nth viewing angles of a three-dimensional display apparatus, respectively, the Mth and (M+1)th of the N two-dimensional images are referred to the two two-dimensional images having adjacent viewing angles, wherein N>2 and M<(N−1), and a zone between the D1th and D2th of the N viewing angles is defined to as a normal-viewing zone; and shifting the N two-dimensional images either in a first direction or in a second direction by a shift value calculated according to a position of a first viewer, a position of a second viewer, the D1th viewing angle and the D2th viewing angle, and thereby projecting the N shifted two-dimensional images through the first to Nth viewing angles of the three-dimensional display apparatus, respectively, when the first viewer is located at the L1th of the N viewing angles and the second viewer is located at the L2th of the N viewing angles, wherein at least one of the L1th and L2th viewing angle is located out of the normal-viewing zone, the shift value is obtained by averaging N1 and N2, N1 is referred to a value by subtracting the position of the first viewer from a boundary position of the D1th viewing angle, and N2 is referred to a value by subtracting the position of the second viewer from a boundary position of the D2th viewing angle.

2. The three-dimensional image adjustment method according to claim 1, wherein the N two-dimensional images are shifted of the shift value in the first direction and thereby projected through the first to Nth viewing angles of the three-dimensional display apparatus when the calculated shift value is positive, the N two-dimensional images are shifted of the shift value in the second direction and thereby projected through the first to Nth viewing angles of the three-dimensional display apparatus when the calculated shift value is negative.

3. The three-dimensional image adjustment method according to claim 1, wherein there is a third viewer located between the first and second viewers.

4. The three-dimensional image adjustment method according to claim 1, wherein there is no any viewer located between the first viewer and N1 and no any viewer located between the second viewer and N2.

5. The three-dimensional image adjustment method according to claim 3, wherein there is no any viewer located between the first viewer and N1 and no any viewer located between the second viewer and N2.

6. A three-dimensional display apparatus, comprising:
a display panel configured to display a three-dimensional image, wherein the three-dimensional image is composed by a first to Nth two-dimensional images with respective different viewing angles and is formed by projecting the N two-dimensional images through a first to Nth viewing angles of the display panel, respectively, the Mth and (M+1)th of the N two-dimensional images are referred to the two two-dimensional images having adjacent viewing angles, wherein N>2 and M<(N−1), and a zone between the D1th and D2th of the N viewing angles are defined to as a normal-viewing zone;

a detection unit configured to detect a number of viewer of the three-dimensional display apparatus and the respective viewing angle of the detected one or more viewers; and a three-dimensional image processing unit configured to provide the three-dimensional image to the display panel, shift the N two-dimensional images either in a first direction or in a second direction by a shift value calculated according to a position of a first viewer, a position of a second viewer, the D1th viewing angle and the D2th viewing angle, and thereby project the N shifted two-dimensional images through the first to Nth viewing angles of the display panel, respectively, when the first viewer is located at the L1th of the N viewing angles and the second viewer is located at the L2th of the N viewing angles, wherein at least one of the L1th and L2th viewing angle is located out of the normal-viewing zone, the shift value is obtained by averaging N1 and N2, N1 is referred to a value by subtracting the position of the first viewer from a boundary position of the D1th viewing angle, and N2 is referred to a value by subtracting the position of the second viewer from a boundary position of the D2th viewing angle.

7. The three-dimensional display apparatus according to claim 6, wherein the N two-dimensional images are shifted of the shift value in the first direction and thereby are projected through the first to Nth viewing angles of the display panel when the calculated shift value is positive, the N two-dimensional images are shifted of the shift value in the second direction and are thereby projected through the first to Nth viewing angles of the display panel when the calculated shift value is negative.

8. The three-dimensional display apparatus according to claim 6, wherein there is a third viewer located between the first and second viewers.

9. The three-dimensional display apparatus according to claim 6, wherein there is no any viewer located between the first viewer and N1 and no any viewer located between the second viewer and N2.

10. The three-dimensional display apparatus according to claim 7, wherein there is no any viewer located between the first viewer and N1 and no any viewer located between the second viewer and N2.

* * * * *